(12) United States Patent
Lombardi et al.

(10) Patent No.: US 12,063,492 B2
(45) Date of Patent: Aug. 13, 2024

(54) AUDIO ROUTING SYSTEM FOR ROUTING AUDIO DATA TO AND FROM A MOBILE DEVICE

(71) Applicant: GOOGLE TECHNOLOGY HOLDINGS LLC, Mountain View, CA (US)

(72) Inventors: Michael J. Lombardi, Lake Zurich, IL (US); Mitul R. Patel, Lake Zurich, IL (US); Amber M. Pierce, Evanston, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 18/197,507

(22) Filed: May 15, 2023

(65) Prior Publication Data

US 2023/0283954 A1      Sep. 7, 2023

Related U.S. Application Data

(63) Continuation of application No. 17/850,637, filed on Jun. 27, 2022, now Pat. No. 11,689,854, which is a
(Continued)

(51) Int. Cl.
*H04R 3/12* (2006.01)
*G06F 3/16* (2006.01)
*H04L 12/28* (2006.01)

(52) U.S. Cl.
CPC ............... *H04R 3/12* (2013.01); *G06F 3/165* (2013.01); *G06F 3/167* (2013.01); *H04L 12/2838* (2013.01); *H04L 2012/2849* (2013.01)

(58) Field of Classification Search
None
See application file for complete search history.

(56) References Cited

U.S. PATENT DOCUMENTS 6,181,739 B1   1/2001   Ryde et al.
6,658,091 B1   12/2003  Naidoo et al.
(Continued)

OTHER PUBLICATIONS

Engadget, "Ion unveils cellphn. accs. for hm. phn. rplcmnt., spkrphns", engadget.com /2013/01/06/ion-cellphone-accessories-speakerphone-home-phone/, Oct. 14, 2013. dated Jan. 6, 2013.
(Continued)

*Primary Examiner* — Paul W Huber
(74) *Attorney, Agent, or Firm* — Gray Ice Higdon

(57) ABSTRACT

A method includes receiving sound by a first audio unit installed in an electrical outlet, routing audio data corresponding to the received sound from the first audio unit to a second audio unit installed in a second electrical outlet, and sending the audio data to a mobile device using a wireless link between the mobile device and the second audio unit. Routing the audio data may include receiving the audio data from the first audio unit by a third audio unit and routing the audio data to the second audio unit by the third audio unit serving as a router. The data may be routed using table driven routing, on-demand routing or some other appropriate routing protocol. The method may also include performing voice recognition on the audio data and detecting a command word and routing command word data to the second audio unit.

18 Claims, 5 Drawing Sheets

Related U.S. Application Data continuation of application No. 17/122,889, filed on Dec. 15, 2020, now Pat. No. 11,375,313, which is a continuation of application No. 16/935,651, filed on Jul. 22, 2020, now Pat. No. 10,887,695, which is a continuation of application No. 16/246,040, filed on Jan. 11, 2019, now Pat. No. 10,735,857, which is a continuation of application No. 15/604,332, filed on May 24, 2017, now Pat. No. 10,182,293, which is a continuation of application No. 14/065,506, filed on Oct. 29, 2013, now Pat. No. 9,668,052.

(60) Provisional application No. 61/881,965, filed on Sep. 25, 2013.

(56) References Cited

U.S. PATENT DOCUMENTS

| | | |
|---|---|---|
| 6,792,263 B1 | 9/2004 | Kite |
| 7,391,315 B2 | 6/2008 | Friar |
| 7,764,775 B2 | 7/2010 | Tarkoff et al. |
| 8,054,987 B2 | 11/2011 | Seydoux |
| 8,983,383 B1 | 3/2015 | Haskin |
| 9,443,523 B2 * | 9/2016 | Scheffer .............. H04L 63/0861 |
| 9,668,052 B2 | 5/2017 | Lombardi et al. |
| 10,182,293 B2 | 1/2019 | Lombard et al. |
| 10,735,857 B2 | 8/2020 | Lombardi et al. |
| 10,887,695 B2 | 1/2021 | Lombardi et al. |
| 11,375,313 B2 | 6/2022 | Lombardi et al. |
| 2003/0210770 A1 | 11/2003 | Krejcarek |
| 2005/0026560 A1 | 2/2005 | Villaverde et al. |
| 2010/0087182 A1 | 4/2010 | Stewart et al. |
| 2012/0188067 A1 | 7/2012 | Xiao |
| 2013/0057215 A1 | 3/2013 | Rajeswaran et al. |
| 2013/0077609 A1 | 3/2013 | Mondal |
| 2013/0089026 A1 | 4/2013 | Piper et al. |
| 2013/0103765 A1 | 4/2013 | Papakipos et al. |
| 2013/0150114 A1 | 6/2013 | Bodley et al. |
| 2013/0343568 A1 | 12/2013 | Mayman et al. |
| 2021/0105562 A1 | 4/2021 | Lombardi et al. |
| 2022/0329944 A1 | 10/2022 | Lombardi et al. |

OTHER PUBLICATIONS

Engadget, "ZOMM Uses Bluetooth to Tether You to Your Phone . . .", engadget.com/ 2010/01/04/zomm-uses-bluetooth-to-tether-you-to-your-phone-your-phone-to-y/, Oct. 14, 2013. dated Jan. 4, 2010.
Home Plug, "devolo dLAN Audio Extender—dLAN Audio Extender", http://homeplug.certapp.net/showcase/product/70/, Oct. 14, 2013, 2 pages.
International Search Report and Written Opinion in Application No. PCT/US2014/050495 mailed Nov. 20, 2014. Nov. 20, 2014.
Mobile Burn, "The First Hands-Free Spkrphn. that Allows You to Comm. Completely through Voice Commands", mobileburn.com/pressrelease.jsp?Id=9455, Oct. 14, 2013. dated Oct. 14, 2013.
pcmag.com, "SuperTooth HD", http://www.pcmag.com/article2/0,2817,2387163,00.asp, Oct. 14, 2013, 5 pages.

* cited by examiner

AUDIO ROUTING SYSTEM FOR ROUTING AUDIO DATA TO AND FROM A MOBILE DEVICE

FIELD OF THE DISCLOSURE

The present disclosure relates generally to mobile devices and speaker phone extension devices and more particularly to voice recognition systems and routing audio data between devices.

BACKGROUND

Many current mobile devices include voice command capability to enable response to a user's voice commands for control of voice operated dialing or other features. In some mobile devices the voice command system may be capable of waking the mobile device from a low-power sleep mode. This may be accomplished in such existing mobile devices, by having the voice command system active even during the sleep mode and always listening for a specific command word or command phrase. When an appropriate command word or command phrase is recognized, the voice command system wakes the mobile device from sleep mode and appropriately responds to the command. Thus such mobile devices allow for hands-free interaction through voice control.

One challenge for mobile device voice command systems is in obtaining a clear audio input to the mobile device microphone or microphone array. For example, if the user is too far from the mobile device, or if the mobile device is in a pocket, purse or wedged between sofa cushions such that the microphones are obstructed, the user's voice command will either not be picked up by the microphones or will not be recognizable by the voice command system.

One way to overcome this challenge is for the user to wear a separate, remote microphone ensemble such as a headset or earpiece that is wirelessly paired to the mobile device. The drawbacks to this approach include the limited battery charge time of the headset or earpiece and the encumbrance of wearing the ensemble. Another drawback is that the ensemble must be kept within relative close proximity to the mobile device so as to maintain a wireless link. Also, increasing the distance between the mobile device and the ensemble may further drain the batteries of both the ensemble and the mobile device.

DETAILED DESCRIPTION

Figure 1:
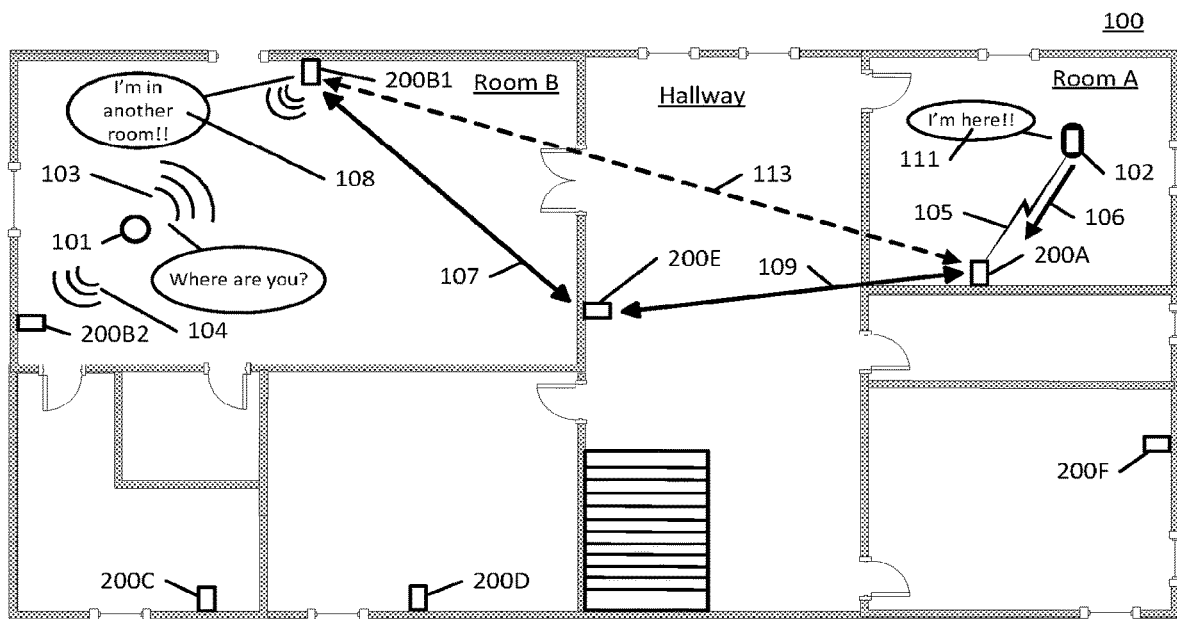
FIG. 1 is a floor plan showing audio units positioned at various locations within various rooms and routing audio data in accordance with the embodiments.

The disclosed embodiments provide, among other things, an audio routing system having features such that a user can transition from room to room in a house, office, etc., and speak voice commands and hear responses without the need for keeping the mobile device in vocal range at all times. The audio routing system includes a plurality of audio units and may include a master audio unit in some embodiments. Each audio unit includes a speaker and at least one microphone, and plugs directly into a standard wall AC electrical outlet. This allows the audio unit to receive electrical power anytime it is needed and overcomes one drawback of portable electronic devices, namely, discharged batteries. Each audio unit also includes wireless data capability or power-line carrier data capability and may communicate with other audio units or with a master audio unit. The audio units may therefore be installed by plugging them into electrical outlets throughout a user's home such as in the kitchen, bathrooms, offices, bedrooms, or living rooms of the home.

In one disclosed embodiment, a method of operation includes receiving sound by a first audio unit installed in an electrical outlet, routing audio data corresponding to the received sound from the first audio unit to a second audio unit installed in a second electrical outlet, and sending the audio data to a mobile device using a wireless link between the mobile device and the second audio unit. In some embodiments, routing the audio data may include receiving the audio data from the first audio unit by a third audio unit, and routing the audio data to the second audio unit by the third audio unit serving as a router. Further, in some embodiments, routing the audio data may include routing the audio data using one of table drive routing or on-demand routing.

In some embodiments, the method of operation may further include performing voice recognition on the audio data and detecting a command word, and routing command word data to the second audio unit. In some embodiments, routing the audio data to the second audio unit may include sending the command word data from the first audio unit to the third audio unit using a wireless link between the first audio unit and the third audio unit. In other embodiments, routing the audio data to the second audio unit may be accomplished by sending the audio data from the first audio unit to the third audio unit using a power line carrier connection between the first audio unit and the third audio unit.

In another disclosed embodiment, a method of operation includes receiving sound by a group of audio units installed in a corresponding group of electrical outlets. The method further includes selecting a first audio unit from the group of audio units in response to determining that the first audio unit meets a threshold with respect to processing the received sound. Audio data corresponding to the received sound is then routed from the first audio unit installed in a first electrical outlet to a second audio unit installed in a second electrical outlet, and is sent to a mobile device over a wireless communication link between the second audio unit and the mobile device.

In some embodiments, the method of operation further includes performing voice recognition on the audio data and detecting a command word, and routing command word data to the second audio unit. Depending on the embodiment, performing voice recognition may involve performing voice recognition by one of the first audio unit or a master audio unit serving as a router between the first audio unit and the second audio unit. In that case, the audio data may be routed to the second audio unit only in response to detecting the command word.

In some embodiments, selecting a first audio unit may include a master unit that receives audio data from each audio unit of the group of audio units, and selects the first audio unit based on comparison of one of an audio signal level or a voice confidence metric for a command word detected in the audio data. The metrics are compared for audio data received by the master unit from each of the audio units. Depending on the embodiment, routing audio data may involve routing the audio data from the first audio unit to the second audio unit using a wireless link between the first audio unit and the second audio unit. In other embodiments, routing audio data may involve routing the audio data from the first audio unit to the second audio unit using a power line carrier connection between the first audio unit and the second audio unit over an electrical wiring system connected to a first electrical outlet and the second electrical outlet.

The disclosed embodiments include an audio unit. The audio unit includes a housing that has a two-prong alternating current power plug with the two-prongs extending from the housing, and a transformer and a voltage rectifier installed within the housing and coupled to the power plug. The voltage rectifier is operative to provide direct current to an internal power bus, which is operatively coupled to the voltage rectifier. The audio unit also includes a microphone, a speaker and audio signal conditioning logic, operatively coupled to the microphone and speaker. A first transceiver, operative to establish a connection with a second audio unit is operatively coupled to a controller. The controller is operative to control the transceiver to send audio data the second audio unit. In some embodiments, the audio unit also includes a wireless transceiver that is operatively coupled to the controller, and that is operative to establish a wireless connection with a mobile device.

In some embodiments, the audio unit may further include voice recognition logic. The voice recognition logic is operatively coupled to the audio signal conditioning logic and to the controller, and is operative to detect a command word in audio data output by the audio signal conditioning logic. The controller may be further operative to control the wireless transceiver to send command word data to the mobile device, and may be operative to control the first transceiver to send command word data to the second audio unit.

Further, in some embodiments, the controller is also operative to control the wireless transceiver to receive audio data from the mobile device, and operative to control the first transceiver to receive audio data from the second audio unit and to operate the microphone, speaker and audio signal conditioning logic to provide a speakerphone operation with the mobile device. The first transceiver may be a wireless transceiver in some embodiments, or may be a power line carrier transceiver.

Turning now to the drawings wherein like numerals represent like components, FIG. 1 illustrates a floor plan showing an example audio routing system 100 including various audio units (200A through 200F) positioned at various locations within various rooms in accordance with the embodiments. Although the example audio routing system 100 is shown on a single level floor plan, the embodiments are not limited to such arrangements and the audio routing system 100 may cover multiple floors within a building. For example, audio unit 200A is installed in an electrical outlet within room A which is the same room in which mobile device 102 is located. The mobile device 102 is paired to the audio unit 200A using a wireless link 105. In room B audio unit 200B1 and audio unit 200B2 are installed in respective electrical outlets that are positioned on walls at a 90° angle with respect to each other. The audio routing system 100 also includes audio unit 200C, audio unit 200D, audio unit 200E and audio unit 200F which are each installed in corresponding respective electrical outlets within various rooms. Additional audio units may also be installed on other floors of a multi-level building. One of the audio units, such as audio unit 200E, may be installed in an electrical outlet in a relatively centrally located position such as the hallway shown in FIG. 1 and may serve as a "master" audio unit and router in some embodiments. For example, audio data may be routed between audio unit 200B1 and audio unit 200A using the master audio unit 200E as a router.

In one example of operation, the audio unit 200B1 will establish a communication link 107 with the master audio unit 200E via an appropriate routing path, and the master audio unit 200E will establish a second communication link 109 with audio unit 200A via another appropriate routing path. These routing paths may be facilitated by peer-to-peer wireless connections between various audio units, or by power-line carrier connections over a building electrical system to which the various AC power outlets are connected.

In accordance with the embodiments, the various audio units located in the various rooms (an on various floors in some embodiments) serve to extend the audio features and capabilities of the mobile device 102 including voice command features. In other words, the user 101 may leave the mobile device 102 anywhere within a home or office and still be able to access and control the mobile device 102 using voice commands from other rooms where audio units are installed. In one example application of the audio routing system 100, a user 101 may speak a voice command which may be a query. For example, the user may ask the mobile device 102 "Where are you?" The user's voice creates sound waves 103 and sound waves 104 which may be picked up by microphones within various audio units. The user's voice command query will be routed by one of the audio units within a room depending on criteria such as, but not limited to, the "best" received audio signal level, the best voice recognition confidence metric, or some other suitable criteria. For example, assuming the audio unit 200B1 is selected as the best audio unit to transmit the user's voice command query, then the audio unit 200B1 will establish a routing path 113 to the audio unit 200A. As mentioned above, the routing may be facilitated by a master audio unit 200E in some embodiments. The audio unit 200A will send audio data, or in some embodiments the command query data output from voice recognition logic, to the mobile device 102 using the wireless link 105. In response to the query, the mobile device 102 may send audio report data 106 to the audio unit 200A using the wireless link 105. The audio unit 200A will then route the audio report data 106 to the audio unit 200B1 using an appropriate routing path 113. The audio unit 200B1 will then play an audio report 108 such as, for example, "I'm in another room!" The mobile device 102 may also provide an audio report 111 from its own speaker such as "I'm here!" such that the user 101 may locate the mobile device 102 as the user 101 moves throughout the various rooms. In some embodiments where a master audio unit is employed, such as master audio unit 200E, the audio unit 200A may use the communication link 109 to send the audio report data 106 to the master audio unit 200E for routing on to the audio unit 200B1 using communication link 107. In other words, in some embodiments, the routing path 113 is facilitated through the master audio unit 200E. However in other embodiments, a master audio unit may not be present and various ad-hoc like routing protocols may be employed such as, but not limited to, table-driven routing, on-demand routing, or some other suitable routing protocol.

For example, in the case of table driven routing, a routing table may be generated by either one of the audio units or by a distributed function distributed among the various audio units such that the routing table is stored within each of the various audio units. Thus, if the user were to remove an audio unit from an electrical outlet such that the audio unit is taken out of service from the audio routing system 100, a new routing table would be generated based on the new audio routing system 100 topology and the new routing table would be stored in each of the audio units remaining in service. In an example of on-demand routing, one or more audio units receiving sound would broadcast route requests until a route to the audio unit having a wireless link 105 to the mobile device 102 is obtained. In this case, the route may be facilitated directly between two audio units or through any suitable number of audio units. For example, in some embodiments, communication link 107 and communication link 109 may be wireless links similar to wireless link 105. However, in other embodiments, communication link 107 and communication link 109 may be facilitated by power-line carrier communication links over the electrical system wiring to which each of the electrical outlets is connected. In the power-line carrier case, direct connectivity may be established between two audio units or data may be routed using audio units connected along the pathway.

In embodiments where the audio units communicate using wireless links, it is possible that the two audio units that need to communicate are outside of the wireless coverage range or are otherwise impeded from communicating directly wirelessly. For example, audio unit 200B1 may be unable to establish a wireless link directly with audio unit 200A due to impedance cause by various walls or other objects such as furniture that block the wireless path between the two audio units. Thus if, for example, audio unit 200D is able to communicate wirelessly with audio unit 200C, and audio unit 200C is able to communicate wirelessly with audio unit 200B2, then audio unit 200B2 may be used as an initial routing point for audio data sent wirelessly from audio unit 200B1. Alternatively, audio unit 200B2 may be used as the receiving point for the user's voice or voice commands based on audio unit 200B2 being able to establish a wireless routing path to audio unit 200A whereas audio unit 200B1 is unable to communicate with audio unit 200A directly.

Figure 2:
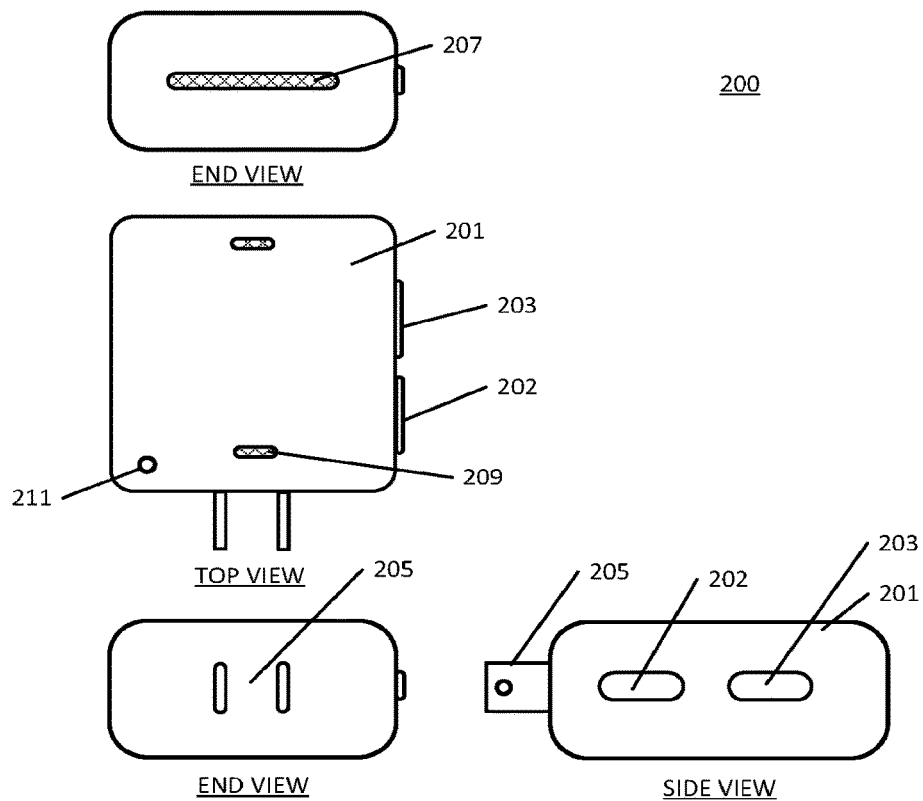
FIG. 2 is diagram showing various views of an audio unit in accordance with an embodiment.

FIG. 2 is diagram showing various views of one example of an audio unit 200 in accordance with an embodiment. It is to be understood however that the example audio unit 200 is only one possible physical configuration of an audio unit and is not to be construed as a limitation on the particular form that an audio unit may take in accordance with the various embodiments. Some example features of an audio unit are shown in FIG. 2 that may be present in audio units having different physical configurations different than those shown in the example of FIG. 2. The audio unit 200 includes a housing 201 which has an AC power plug 205 installed within the housing 201 and projecting therefrom such that the audio unit 200 may be installed in a standard AC electrical outlet such as found in a home or office building etc. In some embodiments, the prongs of the AC power plug 205 may pivot or rotate such that they may be stored within an indentation (not shown) in the housing 201 for storing the AC power plug 205 when the audio unit 200 is not in use. The housing 201 includes a speaker port 207 and one or more microphone ports 209. In some embodiments the housing 201 includes a status LED 211. A user interface may also be present in some embodiments such as, for example, control button 202 and control button 203. The control buttons 202 and 203 may be mechanical pushbutton type controls or touch sensitive controls in some embodiments such that there are no mechanical switch mechanisms involved. The example audio unit 200 is light weight and portable and may be similar to an AC charger housing such as accessory AC chargers provided with a cord to attach to a mobile device for purposes of charging a battery within the mobile device. However as shown in FIG. 2, the housing 201 does not include any attached cord with respect to the example audio unit 200.

In some embodiments the control buttons 202 and 203 may be a volume button (to adjust response volume) and a mute button. The mute button may silence audio coming from an audio unit or may turn off the microphone such that the audio unit will no longer receive the user's voice commands. In other embodiments, the mute button may serve as an "unmute" button if audio is being played from a first audio unit, but the user desires audio to be played from one or more additional audio units. For example, a user may speak a command such as "shuffle music" in proximity of a kitchen audio unit. In that case, the mobile device would start playing music through the kitchen audio unit. If the user then moved to a different room, the user could press the mute/unmute button on a living room audio unit to playback the music through the living room audio unit as well.

Figure 3A:
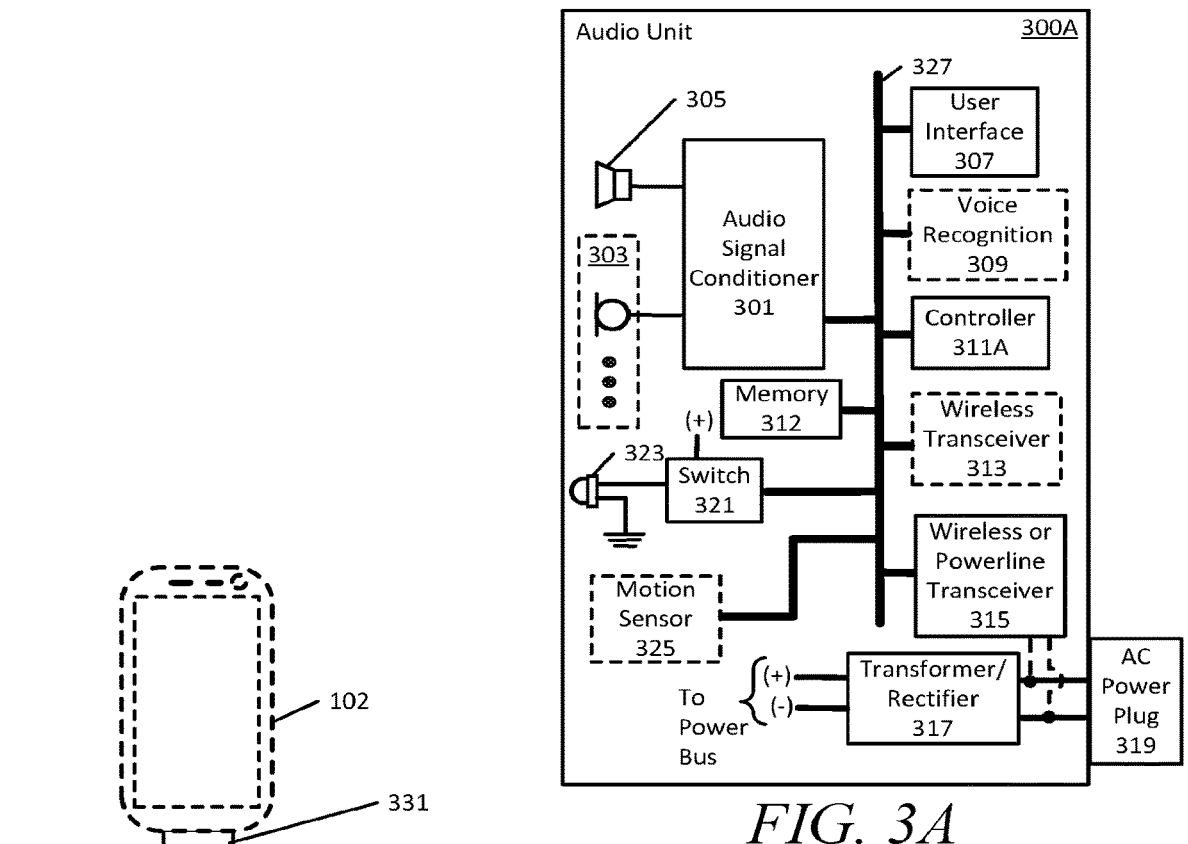
FIG. 3A and FIG. 3B are schematic block diagrams that provide examples of various types of audio units that may be used in accordance with various embodiments.
Figure 3B:
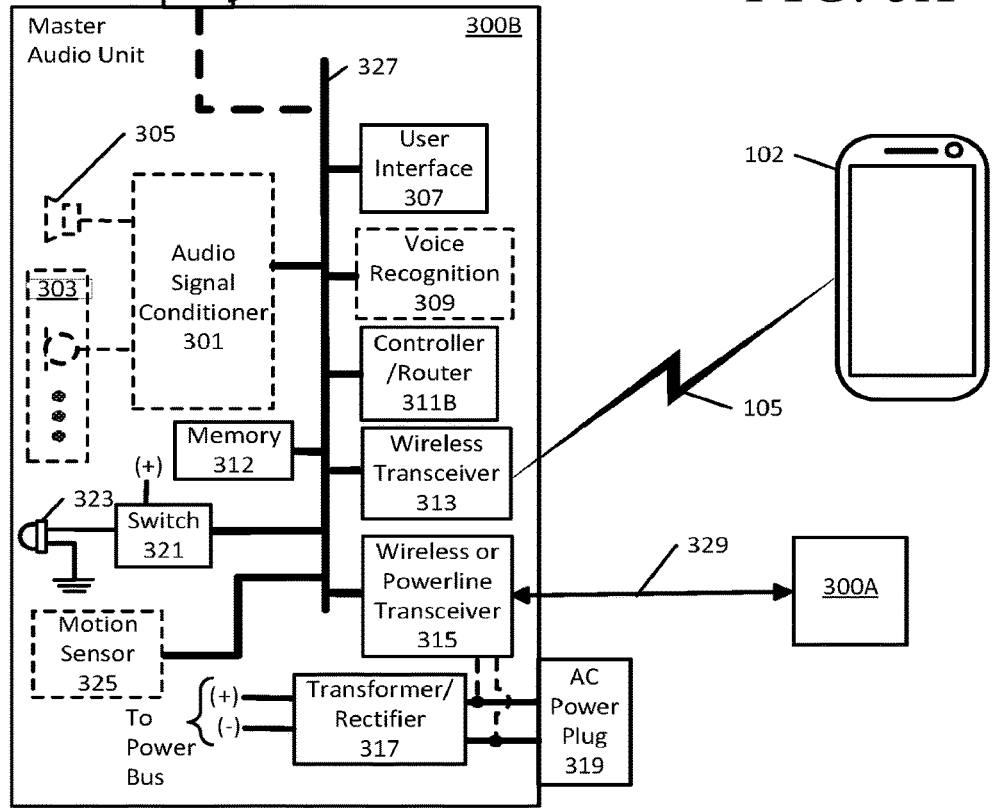

FIG. 3A and FIG. 3B are schematic block diagrams that provide examples of various types of audio units that may be used in accordance with various embodiments. FIG. 3A illustrates various embodiments of a basic audio unit 300A and FIG. 3B illustrates various embodiments of a master audio unit 300B. Components that may be present in only some embodiments are shown using dotted lines to emphasize that such components may or may not be present depending on the particular embodiment. It is to be understood that with respect to FIG. 3A and FIG. 3B, like reference numerals that are reused between FIG. 3 and FIG. 3B indicate like or similar components.

Thus with respect to the example basic audio unit 300A and example master audio unit 300B, both include an internal communication bus 327 which provides operative coupling between the various internal components. The audio unit 300A or 300B components may include, but are not limited to, a user interface 307 (which may include control buttons 202 and 203), a controller 311A (or controller/router 311B in master audio unit 300B), non-volatile, non-transitory memory 312, a wireless transceiver 313, a wireless or power-line carrier transceiver 315, and an audio signal conditioner 301. One or more microphones 303 (such as a microphone array) and a speaker 305 are operatively coupled to the audio signal conditioner 301. The master audio unit 300B may or may not include the audio signal conditioner 301 and the corresponding one or more microphones 303 and speaker 305. The audio signal conditioner 301, when present in an embodiment, provides audio signal conditioning logic that may include analog-to-digital converters (ADCs), digital-to-analog converters (DACs), high-pass filters, low-pass filters, band-pass filters, or adjustable band filters that may be applied to filter noise from received audio. The audio signal conditioner 301 may include gain including automatic gain control (AGC) in some embodiments. The audio signal conditioner 301 may also include an echo canceller in some embodiments, to prevent echoing and feedback between the microphones 303 and the speaker 305 during full-duplex communication such as when the audio unit is used as a speakerphone.

A status LED 323 is operatively coupled to switch logic 321 which is further operatively coupled to the internal communication bus 327. The switch logic 321 is operative to receive control commands from the controller 311A (or controller/router 311B) and to light the LED 323 in response to the control commands accordingly. In some embodiments, the LED 323 may provide one or more indications and may be a multi-color LED in some embodiments. For example, the LED may light to show when the audio unit is paired to another audio unit or to a mobile device. The LED may also provide an indication that the audio unit is in use. An AC power plug 319 is connected to a transformer/rectifier 317 which is further connected to an internal power bus (not shown) that provides DC power to the internal components of the audio unit. In embodiments where the wireless or power-line carrier transceiver 315 is a power-line transceiver, the power-line transceiver is operatively coupled to the AC power plug 319 using appropriate safety and filtering circuitry (not shown) so that audio data including voice command data may be sent and received over and electrical system when the AC power plug 319 is inserted into a standard electrical outlet and is thus connected to an electrical wiring system.

In some embodiments, the audio units 300A or 300B may include voice recognition logic 309, and may include a motion sensor 325. In embodiments that include the motion sensor 325, either the controller 311A or the controller/router 311B will be operative to obtain data from the motion sensor 325 and to determine motion in proximity to the respective audio unit. In embodiments in which voice recognition logic 309 is present, the memory 312 may store a library of command words or command phrases (i.e. a vocabulary) that are to be recognized by the voice recognition logic 309. In alternative embodiments, the voice recognition logic 309 may include an integrated memory that stores the command word or command phrase vocabulary.

In some embodiments, the basic audio unit 300A may include wireless transceiver 313 which is operative to communicate over wireless link 105 with mobile device 102. In such embodiments, any basic audio unit may communicate with the mobile device 102 such as audio unit 200A shown in the example of FIG. 2. In embodiments where the basic audio unit 300A does not include wireless transceiver 313, only the master audio unit 300B will be capable of establishing the wireless link 105 with the mobile device 102. In these embodiments, the basic audio units 300A communicate with each other only, or with the master audio unit 300B only, by using wireless or power-line carrier transceiver 315.

The master audio unit 300B may also include a docking connector 331 which may be used to connect the mobile device 102 for purposes of charging and also, in some embodiments, for providing a data connection to the mobile device 102 by way of the internal communication bus 327. That is, the docking connector 331 may be operatively coupled to the internal communication bus 327 and to the power bus (not shown). Is to be understood that in some embodiments, all of the audio units may be include the components of a "master" audio unit 300B where all audio units include audio signal conditioner 301, one or more microphones 303 and a speaker 305. In that case, any audio unit may be designated as a master audio unit while other audio units function only as basic audio units or as slave devices. In other words, the basic audio unit 300A may omit some components such voice recognition logic 309, wireless transceiver 313, motion sensor 325 or some combination thereof in order to reduce the cost of the basic audio unit 300A. Likewise the master audio unit 300B may omit the audio signal conditioner 301, microphones 303 and speaker 305 in order to reduce the cost of the master audio unit 300B. The location of the voice recognition logic 309 may depend on whether a central routing function is used or not. That is, if a master audio unit 300B is used to perform a data routing function, it may also include the voice recognition logic 309 and may perform voice recognition on audio data received from the various basic audio units. Alternatively, the basic audio units 300A may include voice recognition logic 309, and the master audio unit 300B may omit this component. In such embodiments, the basic audio units 300A need only send a data output from the voice recognition logic 309 upon detection of command words or command phrases that match the vocabulary stored in memory 312. That is, the basic audio units 300A need not send all their received audio data when each basic audio unit 300A includes voice recognition logic 309 which reduces bandwidth requirements. In other embodiments, the basic audio units 300A may listen for audio inputs above a certain volume threshold and may discard or never send audio data to the master audio unit if the volume is below a minimum threshold. In such embodiments, the basic audio units 300A may, or may not, include voice recognition logic 309. Based on the above examples, one of ordinary skill will understand that various configurations are possible for the audio routing system 100 and for audio unit internal configurations in light of the above description of example basic audio unit 300A and example master audio unit 300B.

In the various embodiments, the wireless transceiver 313 is operative to establish the wireless link 105 with a mobile device 102. The wireless link 105 may be any suitable type of radio frequency (RF) communication link such as, but not limited to, Bluetooth®, Wi-Fi®, or some other suitable wireless communication link. The wireless or power-line carrier transceiver 315 is operative to establish communication link 329 with other audio units so that audio data or other data including command and control signals may be routed and sent to the mobile device 102. In embodiments where wireless or power-line carrier transceiver 315 is a wireless transceiver, RF protocols such as Bluetooth®, Wi-Fi®, or some other suitable wireless communication link similar to that used by wireless transceiver 313 may also be employed. The controller 311A and controller/router 311B are operative to execute one or more wireless communication protocol stacks and to coordinate communications with other audio units.

Figure 4:
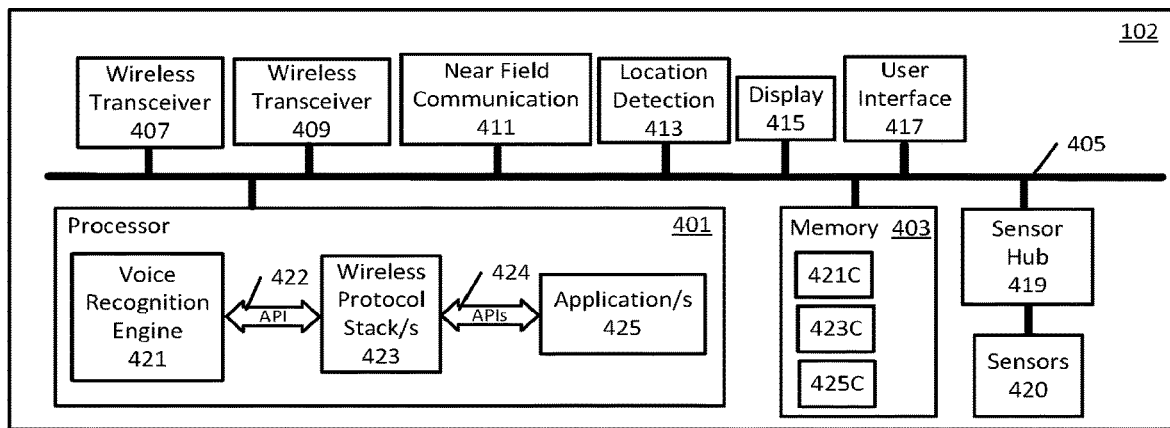
FIG. 4 is a schematic block diagram of a mobile device in accordance with various embodiments.
Figure 5:
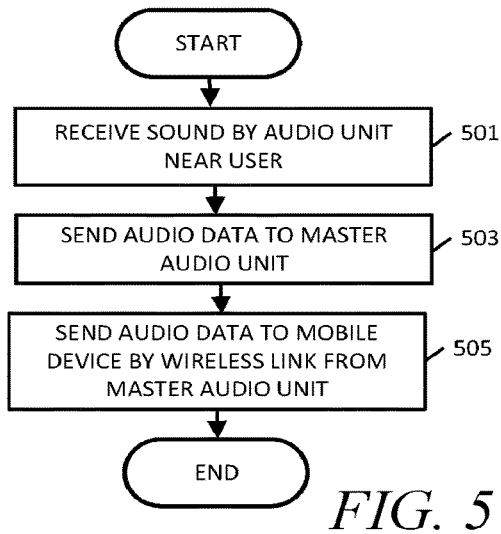
FIG. 5 is a flow chart of a method of operation of an audio routing system in accordance with various embodiments.

A schematic block diagram of a mobile device 102 in accordance with various embodiments is shown in FIG. 4. An example mobile device 102 includes an internal communication bus 405 which provides operative coupling between the various components. The mobile device 102 components may include, but are not limited to, a wireless transceiver 407 operative to communicate with a network, a wireless transceiver 409 operative to communicate peer-to-peer with the audio units, near field communication logic 411, location detection logic 413, a display 415, a user interface 417, at least one processor 401, a non-volatile non-transitory memory 403, and a sensor hub 419. The sensor hub 419 is operatively coupled to a plurality of sensors 420 which may include thermal sensors, proximity sensors, accelerometers, gyroscopic sensors, light sensors, etc.

In accordance with the embodiments, the processor 401 is operative to execute a voice recognition engine 421. The processor 401 is also operative to execute one or more wireless protocol stacks 423 (corresponding to wireless transceiver 407 and wireless transceiver 409) and various other applications 425. The voice recognition engine 421 may interact and communicate with the wireless protocol stacks 423 via an application programming interface API 422 and with the various other applications 425 via APIs 424. Each of the various components of the mobile device 102 that are operatively coupled to the communication bus 405 may also accordingly send information to, or receive information from, the processor 401 and are thus operatively coupled to the voice recognition engine 421, the wireless protocol stacks 423 and the applications 425 via the communication bus 405 and via the various APIs. The memory 403 may store voice recognition logic executable code 421C, wireless protocol stack executable code 423C, and application executable code 425C that may be accessed and executed by the processor 401. That is, the processor 401 is operative to access and execute any executable code stored in memory 403.

Example methods of operation of an audio routing system 100 in accordance with various embodiments will now be described with respect to the flowcharts of FIG. 5 through FIG. 12. The flowcharts of FIG. 5 through FIG. 12 will be described with respect to the audio routing system illustrated in FIG. 1 which is useful for understanding the operations. Thus beginning with FIG. 5, the method of operation begins in operation block 501, and sound is received by an audio unit near the user such as audio unit 200B1. The audio unit 200B1 then sends audio data to the master audio unit 200E as shown in operation block 503. Assuming a wireless link can be established between the master audio unit 200E and the mobile device 102, audio data is sent to the mobile device 102 over the wireless link from the master audio unit 200E as shown in operation block 505. That is, for embodiments in which the method of operation of FIG. 5 applies, wireless communication with the mobile device 102 is facilitated by the master audio unit 200E.

Figure 6:
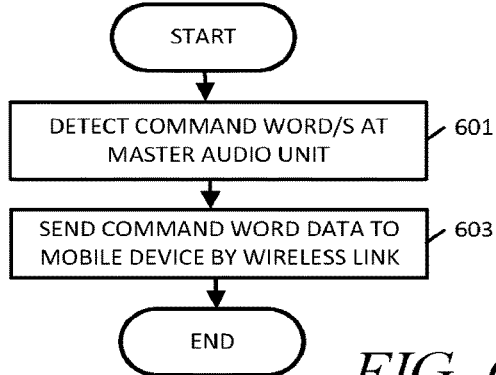
FIG. 6 is a flow chart of a method of operation of a master audio unit in accordance with an embodiment.

Turning to FIG. 6, in operation block 601 command words are detected at the master audio unit 200E. That is, the master audio unit includes the voice recognition logic 309. The voice recognition logic 309 outputs command word data based on one or more detected command words and sends the command word data to the mobile device 102 via a wireless link as shown in operation block 603. The method of operation then ends.

Figure 7:
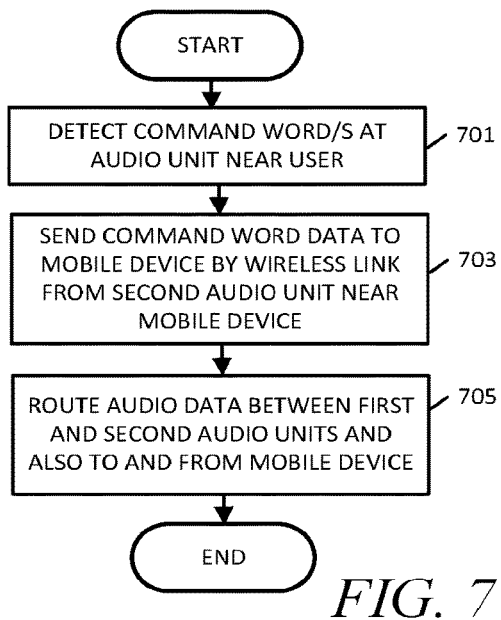
FIG. 7 is a flow chart of a method of operation of an audio routing system in accordance with various embodiments.

In the method of operation illustrated in FIG. 7, and beginning with operation block 701, command words may be detected by a basic audio unit such as the audio unit 200B1 which thus includes the voice recognition logic 309. In operation block 703, the audio unit 200B1 may send command word data to the mobile device 102 by a wireless link 105 from a second basic audio unit such as audio unit 200A which is located near the mobile device 102. In operation block 705, audio data may then be routed between the first audio unit 200B1 and the second audio unit 200A and also to and from the mobile device 102. The method of operation then ends. For the method of operation of FIG. 7, the routing may be facilitated by the master audio unit 200E, or may be facilitated by routing through various other basic audio units such as audio unit 200C, 200D, or 200F, or by a direct routing path 113 between audio unit 200B1 and audio unit 200A as was described above previously.

Figure 8:
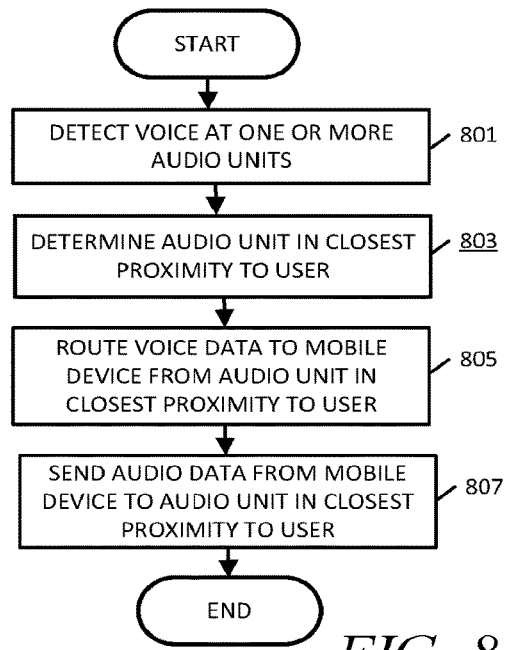
FIG. 8 is a flow chart of a method of operation of an audio routing system in accordance with various embodiments.

In FIG. 8, the method of operation begins and in operation block 801 voice is detected at one or more audio units. For example as shown in FIG. 1, the user 101 may speak and generate sound waves 103 which are received by audio unit 200B1 and sound waves 104 which are received by audio unit 200B2. As would be understood, other audio units, including those in other rooms such as audio unit 200C and audio unit 200D, may also receive sound from the user's voice depending on the direction in which the user 101 is speaking and the volume of the user's voice at that particular time. In operation block 803, the audio routing system 100 will determine the audio unit in close proximity to the user. For example, audio unit 200B1 may be selected. This operation may be performed by controller/router 311B in master audio unit 200E by comparing the audio signal levels received from the various audio units and selecting the audio unit having the "loudest" received audio. One example criteria that may be compared is signal-to-noise ratio however any suitable criteria may be used. In operation block 805, audio data will then be routed to the mobile device 102 from the audio unit selected as being in close proximity to the user. In operation block 807, audio data will then be sent from the mobile device to that same audio unit. The method of operation then ends. Thus for example, if audio unit 200B2 is selected as being in close proximity to the user 101, then audio data from the mobile device 102 will be routed to the audio unit 200B2 rather than to the audio unit 200B1 such that the audio unit 200B2 plays audio over its speaker while the audio unit 200B1 speaker may be temporarily muted.

Figure 9:
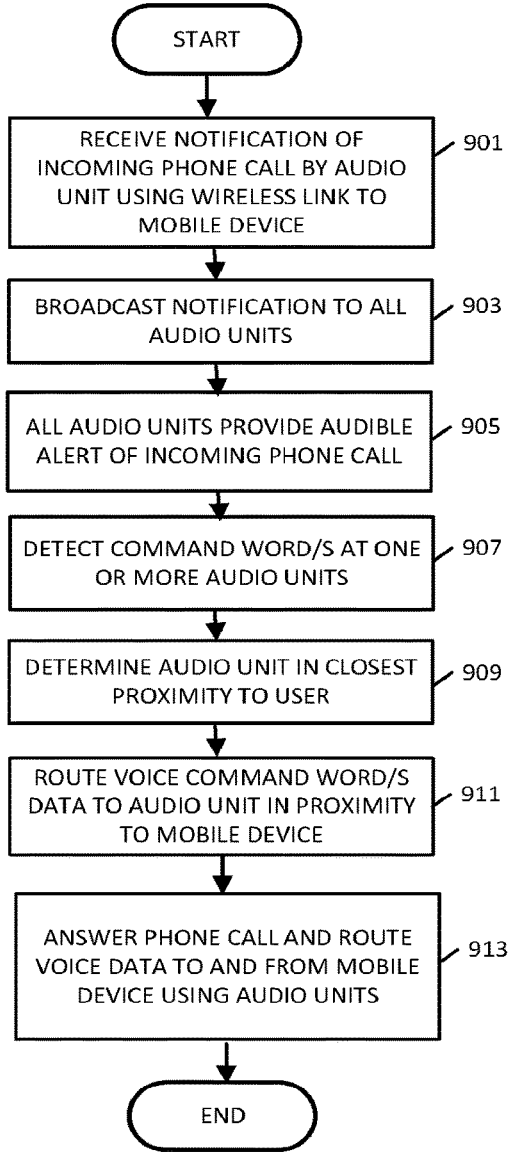
FIG. 9 is a flow chart of a method of operation for handling an incoming phone call by an audio routing system in accordance with various embodiments.

FIG. 9 is a flowchart of a method of operation for handling an incoming phone call by an audio routing system 100 in accordance with various embodiments. Thus in operation block 901, depending on whether a master audio unit is employed or not, a notification of an incoming phone call may be received by audio unit 200A over the wireless link 105. In operation block 903, the notification is then broadcast to all other audio units. This may be facilitated either by using the master audio unit 200E or by a broadcast notification sent directly from audio unit 200A to all other audio units. In operation block 905, all of the audio units will provide an audible alert of the incoming phone call such as a ring tone or some other audible alert. In operation block 907, the user 101 may respond to the audible alert by speaking a command word.

Thus in operation block 907, command words may be detected at one or more audio units such as audio unit 200B1 and audio unit 200B2 which happen to be located in the same room as the user 101. In operation block 909, the audio unit in close proximity to the user will be determined and, in operation block 911, voice command word data will be routed to the audio unit in proximity to the mobile device 102 which, in the example of FIG. 1, is audio unit 200A. In operation block 913, the phone call may be answered based on the user command, and assuming that the user commanded the mobile device 102 to answer the phone call, voice data may subsequently be routed to and from the mobile device 102 using the audio units. The method of operation then ends.

Figure 10:
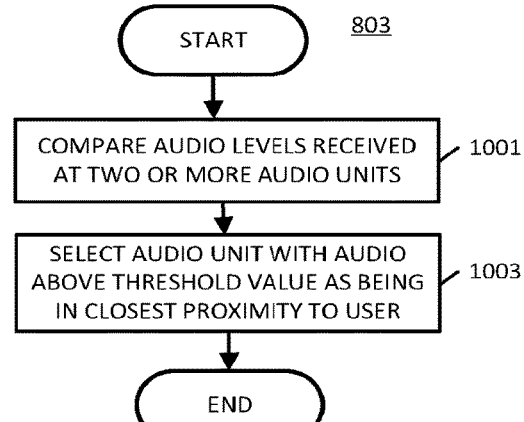
FIG. 10 is a flow chart providing further details of one operation block of the flow chart of FIG. 8 in accordance with some embodiments.

FIG. 10 provides further details of operation block 803 of FIG. 8 which involves determining and selecting an audio unit as being in close proximity to the user. For example, in operation block 1001, audio levels received at two or more audio units may be compared. In operation block 1003, the audio unit having an audio level above a threshold value may be selected as being the audio unit in closest proximity to the user and the method of operation then ends as shown. This is only one example of selecting an audio unit in closest proximity to the user and it is to be understood that various other methods may be utilized in the various embodiments. For example, in embodiments where the audio units include voice recognition logic 309, a voice recognition confidence metric may be used and compared to determine which is the "best" audio unit rather than determining the audio unit in proximity to the user. Also, it is to be understood that the audio level may not necessarily be an indication of actual proximity of an audio unit to the user but may instead provide an indication of the "best" audio unit to utilize at a particular point in time. In embodiments where the audio unit includes a motion sensor 325, data from the motion sensor 325 may also be used to consider whether or not the particular audio unit receiving audio is the "best" audio unit (or is the audio unit in closest proximity to the user) at that particular time. Also, in some embodiments, the best or closest proximity audio unit may dynamically change as the user moves about.

For example, if the user is speaking on a phone call and is walks out of room B, through the hallway, and on to the room in which audio unit 200D is located, then the audio routing system 100 may switch from audio unit 200B1 to audio unit 200E, and then to audio unit 200D, as the closest proximity or best audio unit based on either audio level comparison received by the respective audio unit microphones as the user walks through the rooms, by using voice confidence metrics, output of a motion sensor 325, or by using any combination of those information sources in order to make a decision as to when to switch from one audio unit to another. In other words, one useful feature and advantage of the various embodiments is that the user 101 may engage in a phone call while the mobile device 102 is located in a remote room, even when the user 101 is walking from one room to another, provided that there are a number of audio units such as audio units 200A through 200F installed in various rooms and in locations about which the user 101 is traveling and speaking. As would be understood, the selected audio unit is also used to route audio data from the mobile device 102 such that the speaker output of the audio units will move along with the user 101 as well.

Figure 11:
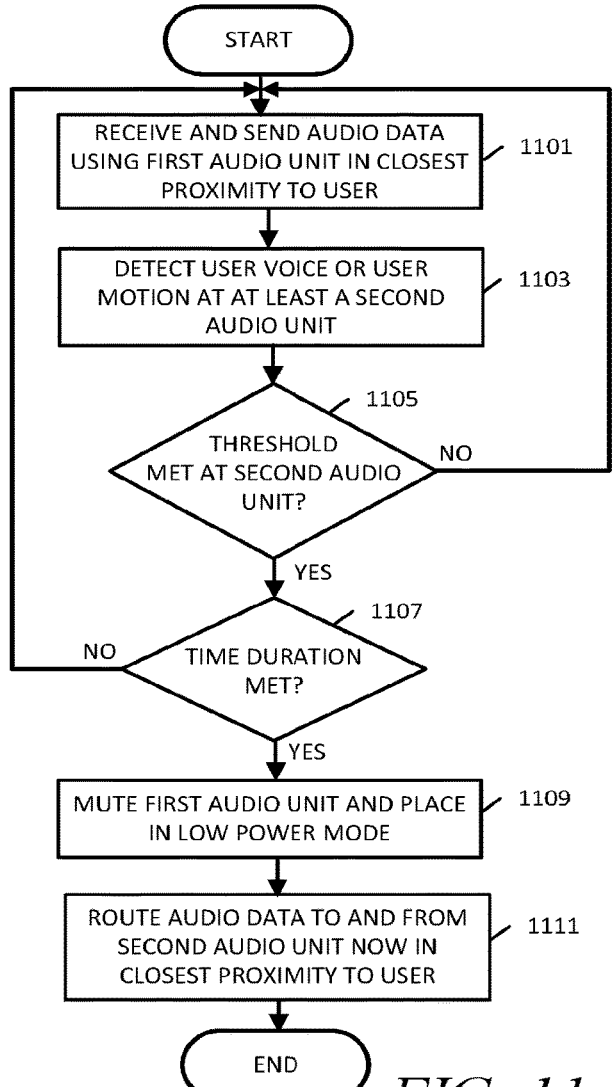
FIG. 11 is a flow chart of a method of operation of an audio routing system in accordance with some embodiments.

The method of operation illustrated by the flowchart of FIG. 11 provides one example of how this "follow me" feature may be accomplished in the various embodiments. In operation block 1101, audio data is received and sent using a first audio unit determined to be in closest proximity to the user (or the "best" audio unit as discussed above). In operation block 1103, either the user's voice or user motion is detected by at least a second audio unit. In decision block 1105, a threshold is tested to see if it is met at a second audio unit. The threshold may be tested by the second audio unit itself, such as by controller 311A, or may be tested by a master audio unit such as by controller/router 311B. The master audio unit may compare results of one or more potential second audio units and select the current closest proximity audio unit. If the basic audio units perform testing themselves, a predetermined threshold is used. If the threshold is met, then the method of operation proceeds to decision block 1107. The threshold in decision block 1105 may be a threshold using any of the criteria discussed previously above such as, but not limited to, an audio level threshold, a voice confidence metric threshold, a motion detection threshold or some other appropriate threshold. In decision block 1107, a time duration requirement may also be tested. If either the threshold of decision block 1105 or the time duration of decision block 1107 is not met, then the method of operation may return to operation block 1101. However, if both the threshold and time duration are met, the method of operation may proceed to operation block 1109 in which the first (previous) audio unit may be muted and placed into a low power mode. In operation block 1111, audio data will then be routed to and from the second audio unit which is now determined to be in closest proximity to the user or the "best" audio unit. Hysteresis may also be applied with respect to the time duration of decision block 1107 to prevent the "popcorn effect" of needless unstable switching between audio units. The hysteresis may be applied by the controller/router 311B of a master audio unit in some embodiments. Upon switching to the next audio unit, the method of operation then ends.

Thus, applying the method of operation of FIG. 11, the example scenarios described above previously where a user may engage in a telephone call and move from one room to another may be facilitated. Other applications may also benefit from the method of operation of FIG. 11, such as audio playback of music or some other type of audio file playback from the mobile device 102 over the speakers of the audio units. For example, the user may listen to music and, as the user moves throughout the building, the music will follow the user by switching from audio unit speaker to audio unit speaker accordingly.

Figure 12:
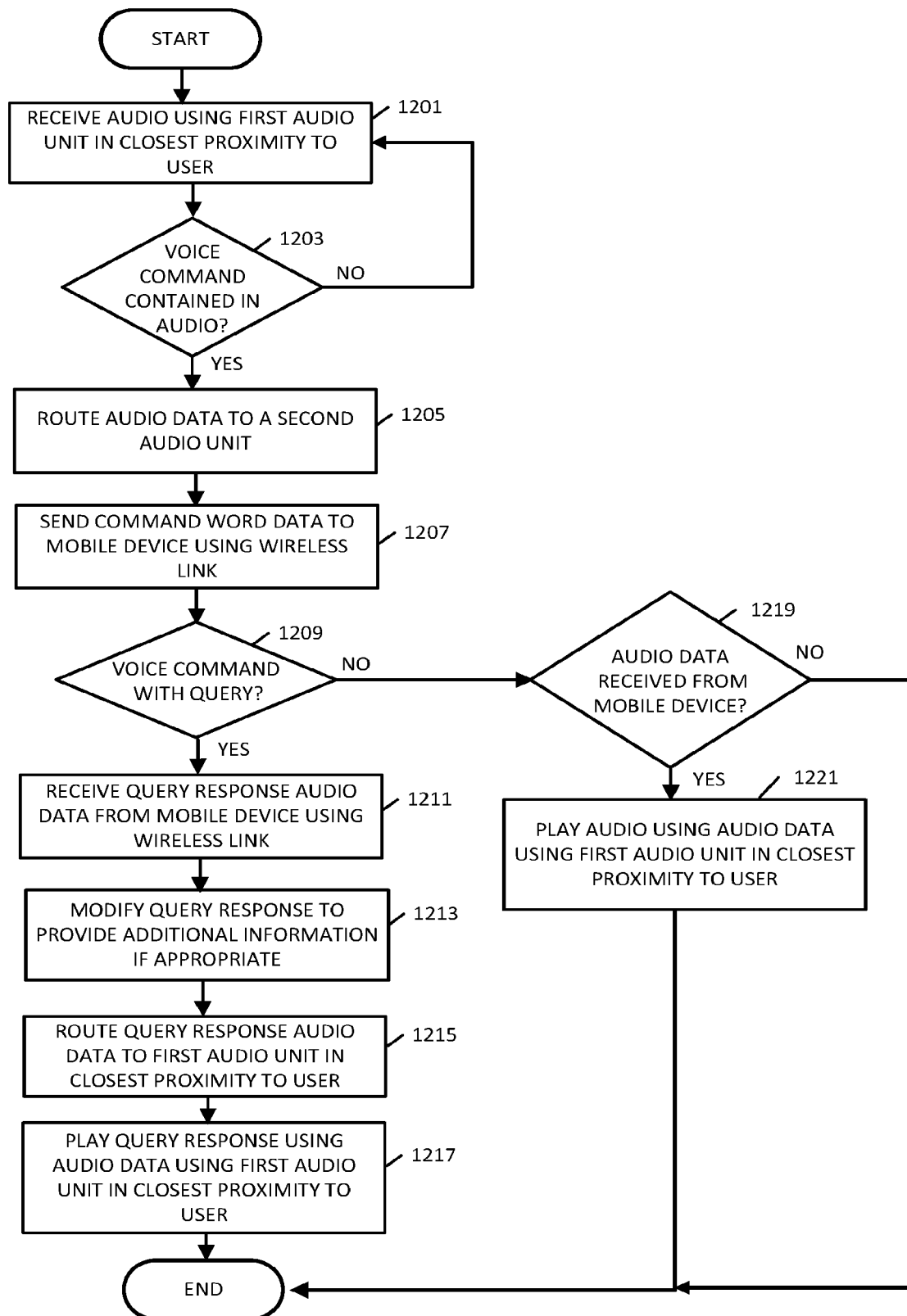
FIG. 12 is a flow chart of a method of operation for a "find me feature" (which is a mobile device location feature) as well as other features of the audio routing system in accordance with various embodiments.

Turning to the flowchart of FIG. 12, a "find me feature" (which is a mobile device location feature) as well as other features of the audio routing system 100 are illustrated. Thus, in operation block 1201, audio may be received by first audio unit in closest proximity to a user (or the "best" audio unit), for example audio unit 200B1. In decision block 1203, the audio may be examined by a voice recognition system to determine if a voice command is contained in the audio. The voice recognition logic 309 may be located in any appropriate location and may therefore be present in either the audio unit 200B1, a master audio unit such as master audio unit 200E, or the voice recognition may be performed by the mobile device 102 depending on the particular embodiment. However, in the embodiments where either the closest proximity audio unit 200B1 or the master audio unit 200E performs voice recognition, a decision may be made as to whether or not to route the audio data to a second audio unit, such as audio unit 200A, which is in proximity to, and paired with, the mobile device 102. In other words, audio data may be ignored if it does not contain a voice command as determined by the voice recognition logic 309. Therefore, in decision block 1203, if a voice command is not contained in the audio, then the audio unit will continue to receive audio using the first audio unit until a voice command is detected in decision block 1203. When a voice command is detected, the method of operation proceeds to operation block 1205 and command word data is routed to a second audio unit. In operation block 1207, the command word data from the voice recognition logic 309 is then sent to the mobile device 102 using the wireless link 105.

If the voice command includes a query as shown in decision block 1209, then, in operation block 1211, the second audio unit 200A will receive query response audio data, such as audio report data 106, from the mobile device 102 over the wireless link 105. In some embodiments, such as those where a master audio unit 200E is utilized, the query response or audio report data 106 may be modified to provide additional information if appropriate as shown in operation block 1213. For example, based on a routing table or other information known to the master audio unit 200E, the location of the mobile device 102 with respect to the user 101 may be known. In that case, the controller/router 311B of master audio unit 200E may modify the audio report data 106 accordingly prior to routing it to the next audio unit. For example, the audio report data may be modified such that the audio report 108 provided to the user 101 is the message "I'm in another room! !" In other words, the master audio unit 200E may be aware that it is communicating with the mobile device 102 via the audio unit 200A which is located in a different physical position from the audio unit 200B1. In some embodiments, the mobile device 102 location may be triangulated by the array of home audio units using wireless signals or audio signals. The master audio unit 200E made thus make an inference that the mobile device 102 is located in another room and change the report data or provide an alternative audio report 108 accordingly. In operation block 1215, the query response audio data, such as audio report data 106, is routed to the audio unit 200B1 so that it will be heard by the user 101.

Also, in some embodiments, the audio report 111 "I'm here" may be played by the speaker of the audio unit 200B1 or only by the mobile device 102 speaker. However, in such embodiments, the user 101 will have to travel through the rooms to figure out where exactly "here" is by listening for the audio report 111 emanating from the mobile device 102 speakers. As would be understood, the audio report 111 may repeat for a predetermined period of time so that the user 101 has time to look around and find the mobile device 102.

As was already described with respect to other embodiments, in operation block 1217, the query response, such as audio report 111 or audio report 108, may be played by the audio unit in closest proximity to the user (or the "best" audio unit) using the received audio report data 106 (or modified audio report data). The method of operation then ends as shown. Returning to decision block 1209, if the voice command does not include a query, then the audio unit in proximity to the user will wait to see if audio data is received from the mobile device as shown in decision block 1219. If not, the method of operation then ends. If yes, then any audio data is played using the audio unit in closest proximity to the user (or "best" audio unit) as shown in operation block 1221 and the method of operation ends.

In embodiments where a master audio unit is used, other features may include capability to turn off audio units or put them into a sleep/standby mode. The master audio unit may also turn audio units off or to standby mode when the mobile device 102 is not in wireless data range of the master audio unit or the basic audio units depending on the embodiment. For example, in some embodiments, the master audio unit may turn the basic audio units on or wake them from standby mode when the mobile device 102 is in wireless data range of the master audio unit.

Basic audio units may be paired to a master audio unit during an initialization procedure of the audio routing system 100. For example, audio units may be paired by the user manually, simultaneously pressing and holding a control button on the master audio unit and on the basic audio unit to initiate pairing. Completed pairing may be indicated by the status LED 323 illuminating (or showing a certain color such as green) or by a sound report from one or both of the master audio unit and the basic audio unit or by both. In other embodiments, the master audio unit may include a near field communication (NFC) unit and the basic audio units may include NFC tags. In such embodiments, pairing may be accomplished by placing a basic audio unit over or near the master audio unit.

In embodiments where the audio units employ Bluetooth®, various Bluetooth® profiles may be used to determine behavior during different audio events. For example, during an incoming call, the Hands-Free Profile (HFP) may be used. This profile supports two-way audio for conversations. In some embodiments, a master audio unit may as a default setting allow the audio ringer to be played on all audio units connected throughout the home. A user may then answer via voice command or button press on a specific audio unit or may ignore the call via voice command or button press. The default setting may be disabled or changed at the master audio unit if desired by the user either by voice command or control button input.

Some embodiments may include an "answer all" feature in which a call may be answered and conducted across all available audio units in the home. For example, this feature is useful if a child is calling home from college and the parents are in different rooms of the home and want to participate in the call or for other like scenarios.

In some embodiments, for multimedia audio playback on the audio units, the Advanced Audio Distribution Profile (A2DP) may be used. For example, in some embodiments, when the master audio unit receives a multimedia audio playback signal, the master audio unit may keep basic audio units muted by default. If the master audio unit includes a speaker, it may play the audio. Any other audio unit may be unmuted by voice command (such as "unmute") or by pressing a control button on an audio unit. Thus, a different command to any audio unit or to the master audio unit (such as "unmute all") may enable playback to all audio units. Any default settings may be modified by the user at the master audio unit via voice command or by using a control button. The above profile descriptions are examples only, and other profiles or wireless protocols may be employed in accordance with the various embodiments.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

The invention claimed is:

1. A method implemented by one or more processors, the method comprising:
    causing audible rendering of music at a first audio unit without any audible rendering of the music at a second audio unit;
    during the audible rendering of the music at the first audio unit without any audible rendering of the music at the second audio unit:
        determining a time duration of the audible rendering of the music at the first audio unit;
        processing, at the second audio unit, audio data that is detected by one or more second unit microphones of the second audio unit and that captures a voice of a user;
        generating, based on the processing, one or more features of the audio data;
        comparing the one or more features of the audio data to one or more thresholds; and determining, based on the comparing and based on the time duration, to transition the audible rendering of the music from the first audio unit to the second audio unit; and in response to determining to transition the audible rendering of the music from the first audio unit to the second audio unit:

initiating the audible rendering of the music at the second audio unit; and ceasing the audible rendering at the first audio unit.

2. The method of claim 1, wherein the one or more features comprise a voice recognition confidence metric of the audio data; and wherein comparing the one or more features of the audio data to one or more thresholds comprises:

comparing the voice recognition confidence metric to a voice recognition confidence metric threshold.

3. The method of claim 2, wherein the voice recognition confidence metric threshold is a predetermined threshold.

4. The method of claim 2, wherein the voice recognition confidence metric threshold is based on an additional voice recognition confidence metric generated at a third audio unit based on processing of additional audio data that is detected by one or more additional microphones of the third audio unit.

5. The method of claim 2, wherein the voice recognition confidence metric threshold is based on an additional voice recognition confidence metric generated at the first audio unit based on processing of additional audio data that is detected by one or more additional microphones of the first audio unit.

6. The method of claim 1, wherein the one or more features comprise a signal-to-noise ratio of the audio data; and wherein comparing the one or more features of the audio data to one or more thresholds comprises:

comparing the signal-to-noise ratio to a signal-to-noise threshold.

7. The method of claim 1, wherein the one or more features comprise an audio level of the audio data; and wherein comparing the one or more features of the audio data to one or more thresholds comprises:

comparing the audio level to an audio level threshold.

8. The method of claim 1, further comprising:

in response to determining to transition the audible rendering of the music from the first audio unit to the second audio unit:

placing the first audio unit into a low power mode.

9. The method of claim 1, wherein causing the audible rendering of the music at the first audio unit, without any audible rendering of the music at a second audio unit, is responsive to a voice command of the user and is responsive to determining that the user was most proximal to the first audio unit when the voice command was provided.

10. A system, comprising:

a first audio unit that includes a first audio unit speaker, a first audio unit microphone, a first audio unit transceiver, first voice recognition logic, and a first audio unit controller;

a second audio unit that includes a second audio unit speaker, a second audio unit microphone, a second audio unit transceiver, second voice recognition logic, and a second audio unit controller, wherein the second audio unit controller is configured to:

during audible rendering of music via the first audio unit speaker of the first audio unit without any audible rendering of the music at the second audio unit:

process audio data that is detected by the second audio unit microphone and that captures a voice of a user;

generate, based on the processing, one or more features of the audio data, wherein the one or more features comprise an audio level of the audio data;

compare the one or more features of the audio data to one or more thresholds, wherein in comparing the one or more features of the audio data to one or more thresholds the second audio unit controller is to:

compare the audio level to an audio level threshold that is a predetermined threshold; and determine, based on the comparing, to transition the audible rendering of the music from the first audio unit to the second audio unit;

cause, in response to determining to transition the audible rendering of the music from the first audio unit to the second audio unit:

initiating of the audible rendering of the music via the second audio unit speaker of the second audio unit.

11. The system of claim 10, wherein the one or more features further comprise a voice recognition confidence metric of the audio data; and wherein in comparing the one or more features of the audio data to one or more thresholds the second audio unit controller is further to:

compare the voice recognition confidence metric to a voice recognition confidence metric threshold.

12. The system of claim 10, wherein the first audio unit is placed into a low power mode in response to determining to transition the audible rendering of the music from the first audio unit to the second audio unit.

13. The system of claim 10, wherein the second audio unit controller is further configured to:

determine a time duration;

wherein in determining to transition the audible rendering of the music from the first audio unit to the second audio unit, the second audio unit controller determines to transition the audible rendering of the music from the first audio unit to the second audio unit further based on the time duration.

14. The system of claim 10, wherein the first audio unit controller is configured to:

cause the audible rendering of the music at the first audio unit responsive to a voice command of the user.

15. The system of claim 14, wherein causing the audible rendering of the music at the first audio unit is further responsive to determining that the user was most proximal to the first audio unit when the voice command was provided.

16. A system, comprising:

a first audio unit that includes a first audio unit speaker, a first audio unit microphone, a first audio unit transceiver, first voice recognition logic, and a first audio unit controller;

a second audio unit that includes a second audio unit speaker, a second audio unit microphone, a second audio unit transceiver, second voice recognition logic, and a second audio unit controller, wherein the second audio unit controller is configured to:

during audible rendering of music via the first audio unit speaker of the first audio unit without any audible rendering of the music at the second audio unit:

process audio data that is detected by the second audio unit microphone and that captures a voice of a user;
generate, based on the processing, one or more features of the audio data, wherein the one or more features comprise an audio level of the audio data;
compare the one or more features of the audio data to one or more thresholds, wherein in comparing the one or more features of the audio data to one or more thresholds the second audio unit controller is to:
  compare the audio level to an audio level threshold that is based on an additional audio level generated at a third audio unit based on processing of additional audio data that is detected by a third audio unit microphone of the third audio unit; and
determine, based on the comparing, to transition the audible rendering of the music from the first audio unit to the second audio unit;
cause, in response to determining to transition the audible rendering of the music from the first audio unit to the second audio unit:
  initiating of the audible rendering of the music via the second audio unit speaker of the second audio unit.

17. The system of claim 16, wherein the audio level threshold is based on a further audio level generated at the first audio unit based on processing of further audio data that is detected by the first audio unit microphone of the first audio unit.

18. The system of claim 16, wherein the second audio unit controller is further configured to:

determine a time duration;

wherein in determining to transition the audible rendering of the music from the first audio unit to the second audio unit, the second audio unit controller determines to transition the audible rendering of the music from the first audio unit to the second audio unit further based on the time duration.

* * * * *